(12) United States Patent
Liu et al.

(10) Patent No.: US 10,215,388 B2
(45) Date of Patent: Feb. 26, 2019

(54) LIGHT SOURCE MODULE AND PROJECTOR

(71) Applicants: I-Ming Liu, Hsin-Chu (TW); Fan-Chieh Chang, Hsin-Chu (TW)

(72) Inventors: I-Ming Liu, Hsin-Chu (TW); Fan-Chieh Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 501 days.

(21) Appl. No.: 14/583,783

(22) Filed: Dec. 29, 2014

(65) Prior Publication Data

US 2015/0276191 A1 Oct. 1, 2015

(30) Foreign Application Priority Data

Mar. 31, 2014 (CN) .......................... 2014 1 0125603

(51) Int. Cl.
*F21V 23/00* (2015.01)
*F21V 23/06* (2006.01)
(Continued)

(52) U.S. Cl.
CPC ............ *F21V 23/002* (2013.01); *F21V 23/06* (2013.01); *G03B 21/208* (2013.01);
(Continued)

(58) Field of Classification Search
CPC .... F21V 23/002; F21V 23/06; F21V 23/2033; G03B 21/208
(Continued)

(56) References Cited

U.S. PATENT DOCUMENTS 8,511,870 B2 8/2013 Robitaille
2008/0251805 A1* 10/2008 Lin ....................... H01L 33/642
257/98
(Continued)

FOREIGN PATENT DOCUMENTS

| CN | 101008737 | 8/2007 | |
|----|-----------|--------|--|
| CN | 201174387 | * 12/2008 | ........... H01L 23/488 |
| CN | 201836826 | 5/2011 | |

OTHER PUBLICATIONS

Machine Translation of the abstract of CN 201174387.*
(Continued)

*Primary Examiner* — Steven H Whitesell Gordon
*Assistant Examiner* — Jerry Brooks
(74) *Attorney, Agent, or Firm* — JCIPRNET (57) ABSTRACT

A projector and a light source module including a light emitting diode element, a pin connector, and two power cords are provided. The light emitting diode element has a first electrode and a second electrode. The pin connector is disposed on the light emitting diode element and has two connection pins, wherein each connection pin has a first connection end and a second connection end, and the two first connection ends respectively contact the first electrode and the second electrode. The two power cords are respectively connected to the first electrode and the second electrode through the two connection pins, wherein each power cord includes a joint and a wire connected to each other, each joint and the corresponding second connection end are mutually plugged along a first axial direction, each wire extends out from the corresponding joint along a second axial direction perpendicular to the first axial direction.

20 Claims, 5 Drawing Sheets

(51) Int. Cl.
    *G03B 21/20* (2006.01)
    *H01R 33/09* (2006.01)
    *H01R 13/717* (2006.01)

(52) U.S. Cl.
    CPC ..... *G03B 21/2033* (2013.01); *G03B 21/2093* (2013.01); *H01R 33/09* (2013.01); *H01R 13/7175* (2013.01)

(58) Field of Classification Search
    USPC .......................................................... 353/85
    See application file for complete search history.

(56) References Cited

U.S. PATENT DOCUMENTS

| | | | | |
|---|---|---|---|---|
| 2009/0256494 | A1* | 10/2009 | Nishinaka | H01L 33/02 315/291 |
| 2011/0097944 | A1 | 4/2011 | Pei et al. | |
| 2012/0249971 | A1* | 10/2012 | Chen | G03B 21/2013 353/31 |
| 2013/0069100 | A1* | 3/2013 | Ahmed | F21V 15/01 257/99 |
| 2013/0175551 | A1* | 7/2013 | Lim | H01L 33/486 257/88 |
| 2013/0201658 | A1* | 8/2013 | Bogart | F21S 4/001 362/95 |
| 2013/0230995 | A1 | 9/2013 | Ivey et al. | |

OTHER PUBLICATIONS

Luminus CST-90 Product Data Sheet.*
"Office Action of China Counterpart Application," dated Aug. 2, 2017, p. 1-p. 9, in which the listed references were cited.

* cited by examiner

LIGHT SOURCE MODULE AND PROJECTOR

CROSS-REFERENCE TO RELATED APPLICATION

This application claims the priority benefit of China application serial no. 201410125603.4, filed on Mar. 31, 2014. The entirety of the above-mentioned patent application is hereby incorporated by reference herein and made a part of this specification.

BACKGROUND

1. Technical Field

The invention relates to a light source module and a projector, and particularly relates to a light source module using a pin connector and a projector having the light source module.

2. Related Art

Projector is a display device used for producing large size images, and an imaging principle thereof is to convert an illumination beam generated by a light source module into an image beam through a light valve, and project the image beam onto a screen or a wall through a lens to form an image. Along with progress of projection technology and reduction of fabrication cost, usage of the projector has gradually extended from commercial use to family use.

In the light source module of the projector, light emitting diodes (LEDs) are gradually used to replace mercury lamps, and in the light source module, a light emitting diode substrate is required to receive power required for emitting light through a power cord. A method for connecting the power cord to the light emitting diode substrate is to directly weld the power cord to a pad on the light emitting diode substrate, though such connection method has a disadvantage of uneasy positioning when the power cord is welded, and since a wire suitable for larger current has a larger wire diameter, difficulties in welding and subsequent repair are increased. Moreover, in the light source module of some projectors, the power cord is fixed to the pad on the light emitting diode substrate through screw locking, and the screw and nut made of a plastic material are selected to avoid unexpected electrical conduction. However, a structural strength of the screw and nut made of the plastic material is inadequate and the screw and nut are liable to be loosen or damaged under a pulling force, and the light emitting diode substrate using the larger current is liable to embrittle and crack the screw and nut that are made of the plastic material due to a long-term of high temperature caused by the large current. Moreover, assembling and maintenance of the power cord assembled through the screw locking method are more time-consuming and labor-consuming. In addition, the direction that the power cord extends out from the light emitting diode substrate is hard to be adjusted because the power cord is fixed to the light emitting diode substrate through welding or screw locking, and thus the power cord occupies a certain configuration space in internal of the projector, which limits a configuration method of other components in the projector.

U.S. Patent Publication No. 20110097944 discloses a light source structure, in which a light emitting element is disposed on a substrate, and a connector is welded to the substrate through a surface mounting technology (SMT) and has an electrode post, and the power is received through the electrode post. U.S. Patent Publication No. 20130230995 discloses a light emitting diode light source, in which a light emitting diode circuit board is electrically connected to a connector through a power supply circuit board. China utility model patent No. 201836826U discloses a light emitting diode light source, where a connector thereof is welded to pads on a metal substrate through the SMT.

SUMMARY

The invention is directed to a light source module, which has a larger light emitting brightness and is easy in assembly and maintenance, and a power cord thereof occupies less internal configuration space of a projector.

The invention is directed to a projector, in which a light source module has a larger light emitting brightness and is easy in assembly and maintenance, and a power cord of the light source module occupies less internal configuration space of the projector.

Other objects and advantages of the invention can be further illustrated by the technical features broadly embodied and described as follows.

In order to achieve one or a portion of or all of the objects or other objects, an embodiment of the invention provides a light source module including a light emitting diode (LED) element, a pin connector, and two power cords. The light emitting diode element has a first electrode and a second electrode. The pin connector is disposed on the light emitting diode element and has two connection pins. Each of the connection pins has a first connection end and a second connection end, and the two first connection ends respectively contact the first electrode and the second electrode. The two power cords are respectively connected to the first electrode and the second electrode through the two connection pins. Each of the power cords includes a joint and a wire connected to each other, each of the joints and the corresponding second connection end are mutually plugged along a first axial direction, each of the wires extends out from the corresponding joint along a second axial direction, and the first axial direction is perpendicular to the second axial direction.

In the light source module of an embodiment of the invention, each of the joints includes a first end portion, a second end portion, and a bending portion. The bending portion is connected between the first end portion and the second end portion, the first end portion and the corresponding connection pin are mutually plugged along the first axial direction, and each of the wires extends out from the corresponding second end portion along the second axial direction.

In the light source module of an embodiment of the invention, a width of each of the connection pins is greater than or equal to 6 millimeters (mm).

In the light source module of an embodiment of the invention, the light emitting diode element is adapted to receive a current greater than or equal to 32 amperes through the pin connector.

In the light source module of an embodiment of the invention, the light emitting diode element includes a substrate, each of the connection pins has a plug section, and the plug section is parallel to the substrate and is plugged to the corresponding joint.

In the light source module of an embodiment of the invention, the light emitting diode element includes a substrate, each of the connection pins has a plug section, and each of the plug sections is perpendicular to the substrate and is plugged to the corresponding joint.

In the light source module of an embodiment of the invention, the substrate has a light emitting surface and a back surface opposite to each other, and each of the plug sections is bended towards the light emitting surface to be perpendicular to the substrate.

In the light source module of an embodiment of the invention, the substrate has a light emitting surface and a back surface opposite to each other, and each of the plug sections is bended towards the back surface to be perpendicular to the substrate.

In the light source module of an embodiment of the invention, the light emitting diode element includes a substrate and a light emitting unit, the light emitting unit is disposed on the substrate, the pin connector has a base, and the base is disposed on the substrate and has a front end and a back end. The front end and the back end are opposite to each other, the back end faces the light emitting unit, and each of the connection pins extends out from the front end.

In the light source module of an embodiment of the invention, the light emitting diode element includes a substrate and a light emitting unit, the light emitting unit is disposed on the substrate, the pin connector has a base, and the base is disposed on the substrate and has a front end, a back end, and two side ends. The front end and the back end are opposite to each other, the two side ends are opposite to each other and are connected between the front end and the back end, the back end faces the light emitting unit, and the two connection pins respectively extend out from the two side ends.

An embodiment of the invention provides a projector including a light source module, a light valve, and a lens. The light source module includes a light emitting diode element, a pin connector, and two power cords. The light emitting diode element has a first electrode and a second electrode. The pin connector is disposed on the light emitting diode element and has two connection pins. Each of the connection pins has a first connection end and a second connection end, and the two first connection ends respectively contact the first electrode and the second electrode. The two power cords are respectively connected to the first electrode and the second electrode through the two connection pins. Each of the power cords includes a joint and a wire connected to each other, each of the joints and the corresponding second connection end are mutually plugged along a first axial direction, each of the wires extends out from the corresponding joint along a second axial direction, and the first axial direction is perpendicular to the second axial direction. The light valve is adapted to convert an illumination beam into an image beam. The lens is adapted to project the image beam.

In the projector of an embodiment of the invention, each of the joints includes a first end portion, a second end portion, and a bending portion. The bending portion is connected between the first end portion and the second end portion, the first end portion and the corresponding connection pin are mutually plugged along the first axial direction, and each of the wires extends out from the corresponding second end portion along the second axial direction.

In the projector of an embodiment of the invention, a width of each of the connection pins is greater than or equal to 6 mm.

In the projector of an embodiment of the invention, the light emitting diode element is adapted to receive a current greater than or equal to 32 amperes through the pin connector.

In the projector of an embodiment of the invention, the light emitting diode element includes a substrate, each of the connection pins has a plug section, and the plug section is parallel to the substrate and is plugged to the corresponding joint.

In the projector of an embodiment of the invention, the light emitting diode element includes a substrate, each of the connection pins has a plug section, and each of the plug sections is perpendicular to the substrate and is plugged to the corresponding joint.

In the projector of an embodiment of the invention, the substrate has a light emitting surface and a back surface opposite to each other, and each of the plug sections is bended towards the light emitting surface to be perpendicular to the substrate.

In the projector of an embodiment of the invention, the substrate has a light emitting surface and a back surface opposite to each other, and each of the plug sections is bended towards the back surface to be perpendicular to the substrate.

In the projector of an embodiment of the invention, the light emitting diode element includes a substrate and a light emitting unit, the light emitting unit is disposed on the substrate, the pin connector has a base, and the base is disposed on the substrate and has a front end and a back end. The front end and the back end are opposite to each other, the back end faces the light emitting unit, and each of the connection pins extends out from the front end.

In the projector of an embodiment of the invention, the light emitting diode element includes a substrate and a light emitting unit, the light emitting unit is disposed on the substrate, the pin connector has a base, and the base is disposed on the substrate and has a front end, a back end, and two side ends. The front end and the back end are opposite to each other, the two side ends are opposite to each other and are connected between the front end and the back end, the back end faces the light emitting unit, and the two connection pins respectively extend out from the two side ends.

According to the above description, the embodiments of the invention have at least one of the following effects. The light source module of the projector of the embodiment of the invention is connected to the power cords through the pin connector, such that a larger current is adapted to be supplied to the light emitting diode element through the wider connection pins of the pin connector, so as to improve the light emitting brightness of the light source module. Moreover, the pin connector and the joint of the power cord are connected through plugging, which is more simple compared to the welding or screw locking method of the conventional technique, such that the light source module is easy in assembly and maintenance/repair. Moreover, the direction that the wire of the power cord extends out from the joint is perpendicular to the direction that the joint is plugged to the connection pin, so that the wire occupies less internal configuration space of the projector, and other components in the projector may have a more flexible arrangement, which avails reducing a whole thickness of the projector.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
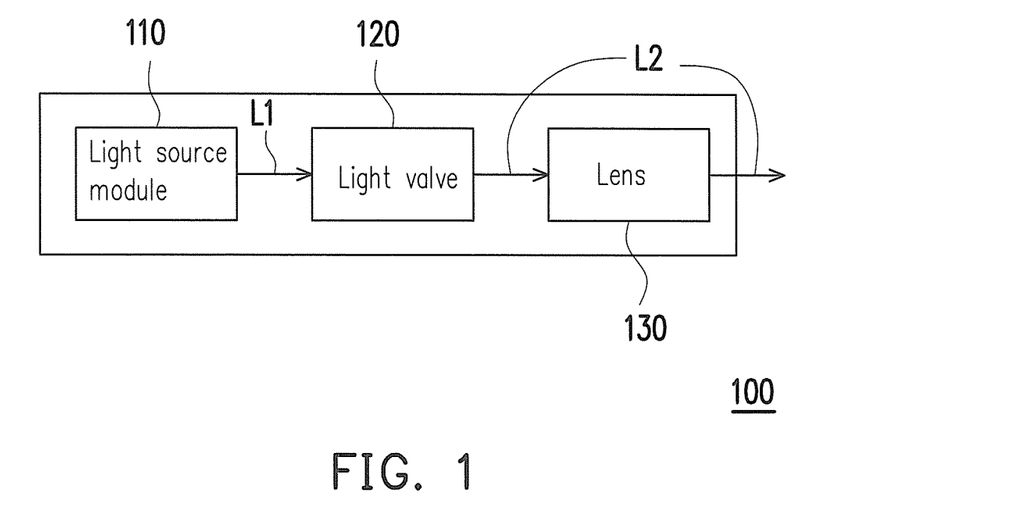
FIG. 1 is a schematic diagram of a projector according to an embodiment of the invention.

Referring to FIG. 1, the projector 100 of the embodiment includes a light source module 110, a light valve 120, and a lens 130. The light source module 110 provides an illumination beam L1, the light valve 120 converts the illumination beam L1 into an image beam L2, and the lens 130 projects the image beam L2. The light source module 110 of the embodiment is a light emitting diode (LED) light source module, and a structure thereof is as follows.

Figure 2:
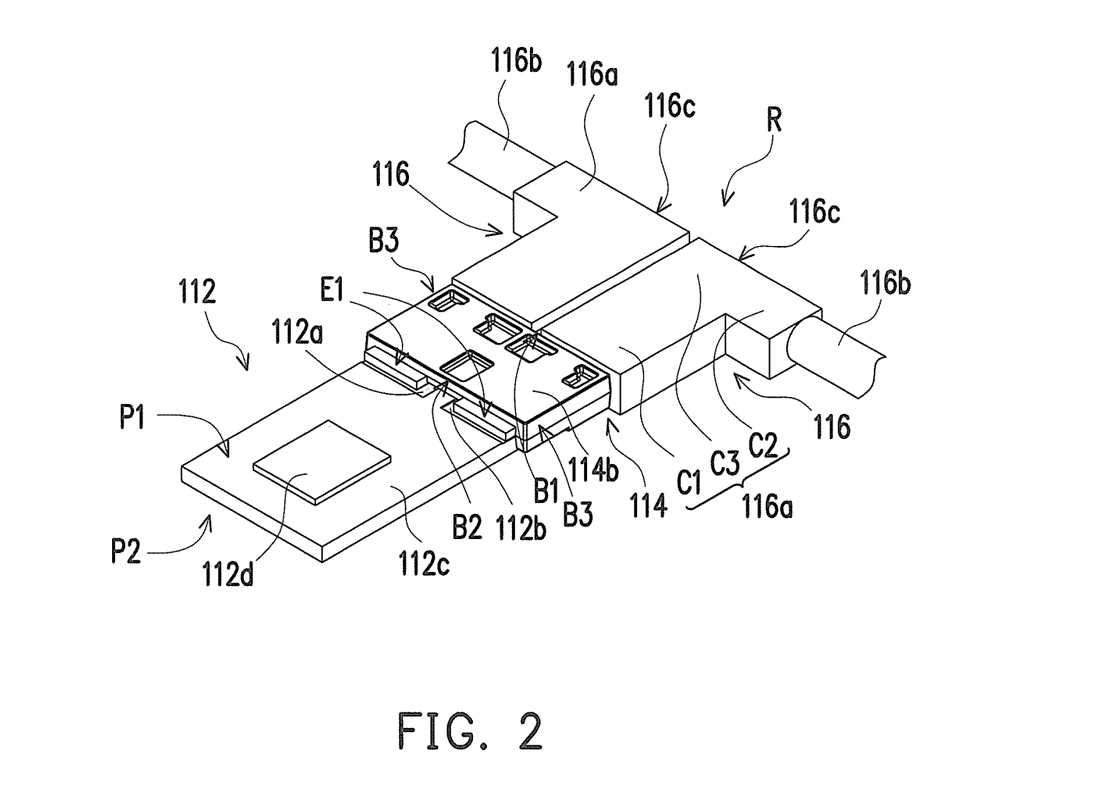
FIG. 2 is a three-dimensional view of a light source module of FIG. 1.
Figure 3:
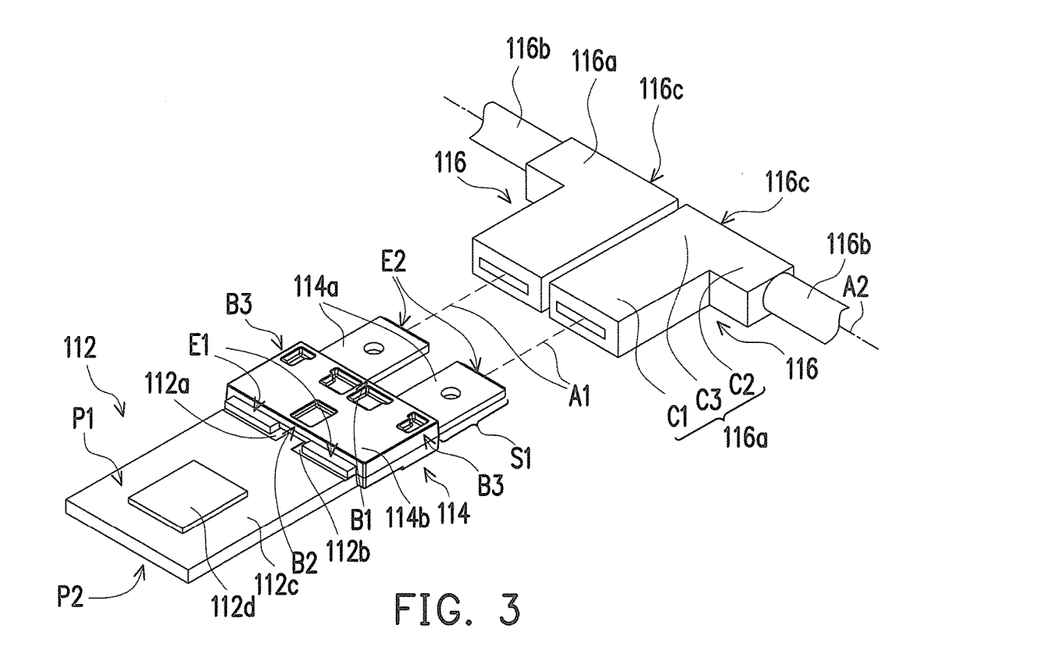
FIG. 3 illustrates unplugged power cords and a pin connector of FIG. 2.
Figure 4:
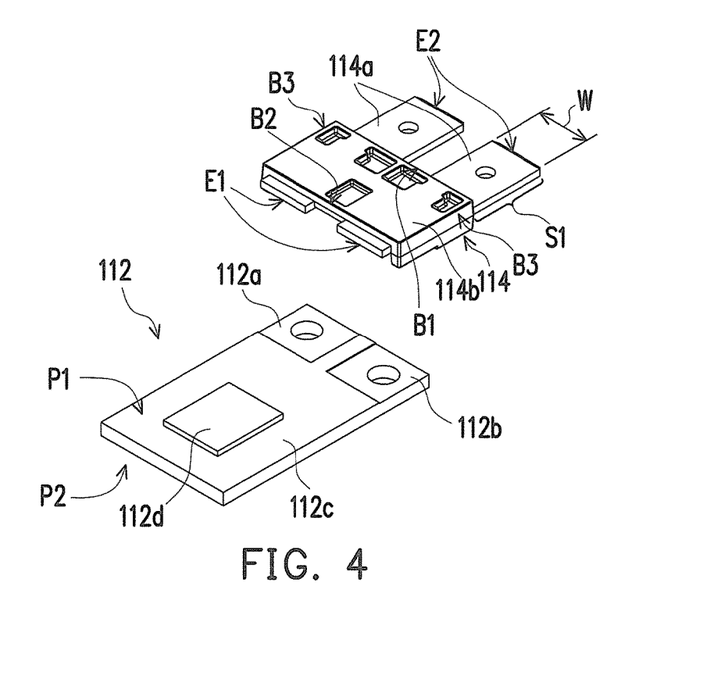
FIG. 4 is an exploded view of a light emitting diode element and the pin connector of FIG. 3.

Referring to FIG. 2 to FIG. 4, the light source module 110 of the embodiment includes a light emitting diode element 112, a pin connector 114, and two power cords 116. The light emitting diode element 112 has a first electrode 112a and a second electrode 112b. The pin connector 114 is disposed on the light emitting diode element 112 and has two connection pins 114a. Each of the connection pins 114a has a first connection end E1 and a second connection end E2. The two first connection ends E1 respectively contact the first electrode 112a and the second electrode 112b of the light emitting diode element 112. The two power cords 116 are respectively connected to the first electrode 112a and the second electrode 112b of the light emitting diode element 112 through the two connection pins 114a, so as to provide power required by the light emitting diode element 112. In the embodiment, the first connection end E1 of each of the connection pins 114a is, for example, fixed to the first electrode 112a of the light emitting diode element 112 through a surface mounting technology (SMT).

Under the above configuration, the light source module 110 of the projector 100 is connected to the power cords 116 through the pin connector 114, so that a larger current may be supplied to the light emitting diode element 112 through the wider connection pins 114a of the pin connector 114, so as to improve the light emitting brightness of the light source module 110. For example, a width W (shown in FIG. 4) of each of the connection pins 114a is, for example, greater than or equal to 6 millimeters (mm), and the first electrode 112a and the second electrode 112b accordingly have a width greater than or equal to 6 mm. In this way, each of the connection pins 114a and the corresponding electrode (i.e. the first electrode 112a or the second electrode 112b) may have a larger contact area, and the light emitting diode element 112 is capable of receiving a current greater than or equal to 32 amperes through the pin connector 114. Moreover, the power cords 116 and the pin connector 114 are connected through plugging, which is more simple compared to the welding or screw locking method of the conventional technique, such that the light source module 110 is easy in assembly and maintenance/repair.

In detail, each of the power cords 116 of the embodiment includes a joint 116a and a wire 116b connected to each other. Each of the joints 116a includes a first end portion C1, a second end portion C2, and a bending portion C3, and the bending portion C3 is connected between the first end portion C1 and the second end portion C2. Referring to FIG. 3, the first end portion C1 of each joint 116a and the second connection end E2 of the corresponding connection pin 114a are mutually plugged along a first axial direction A1, and each of the wires 116b extends out from the second end portion C2 of the corresponding joint 116a along a second axial direction A2 perpendicular to the first axial direction A1. In this way, each of the wires 116b does not extend out from a back end 11c of the corresponding joint 116a along the first axial direction A1, so that a configuration space at a region R indicated in FIG. 2 is not occupied, and other components in the projector 100 (shown in FIG. 1) may have a more flexible arrangement. Further, the first axial direction A1 is, for example, a thickness direction of the projector 100. Therefore, each of the wires 116 does not extend to the region R along the first axial direction A1 like the above mention, the whole thickness of the projector 100 may be reduced.

Referring to FIG. 3 and FIG. 4, in the embodiment, the light emitting diode element 112 includes a substrate 112$c$ and a light emitting unit 112$d$. The substrate 112$c$ has a light emitting surface P1 and a back surface P2 opposite to each other, and the light emitting unit 112$d$ is disposed on the light emitting surface P1 of the substrate 112$c$. The pin connector 114 has a base 114$b$, and the base 114$b$ is disposed on the substrate 112$c$ and has a front end B1, a back end B2, and two side ends B3. The front end B1 and the back end B2 are opposite to each other, the two side ends B3 are opposite to each other and are connected between the front end B1 and the back end B2, the back end B2 faces the light emitting unit 112$d$, and each of the connection pins 114$a$ extends out from the front end B1. Moreover, each of the connection pins 114$a$ has a plug section S1, and the plug section S1 is parallel to the substrate 112$c$ and is plugged to the joint 116$a$ of the corresponding power cord 116. The position of the connection pins and the extending direction of the plug section are not limited by the invention, which may be changed according to an actual design requirement, so as to further improve configuration flexibility of the other components in the projector. Examples are provided below with reference of figures.

It should be noticed that the element names of the aforementioned embodiment are adopted in the following embodiments, in which the same element names denote the same or like components, and descriptions of the same technical contents are omitted. The aforementioned embodiment may be referred for descriptions of the omitted part, and details thereof are not repeated.

Figure 5:
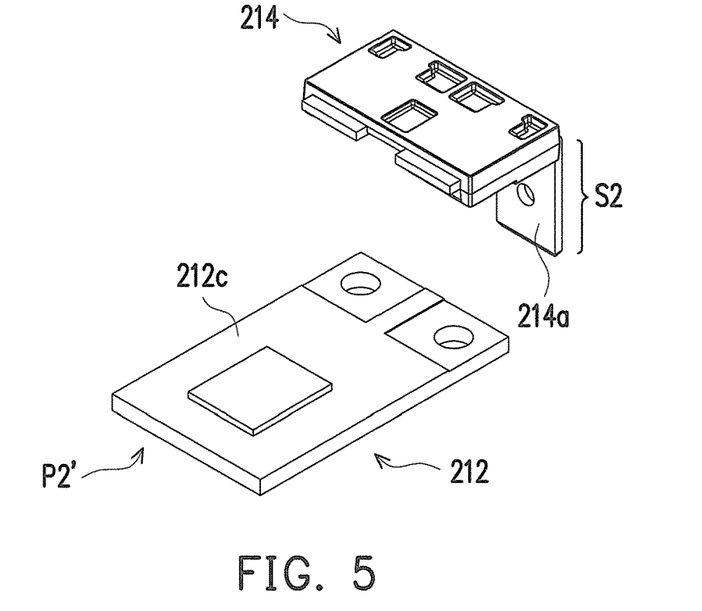
FIG. 5 is an exploded view of a light emitting diode element and a pin connector according to another embodiment of the invention.

Referring to FIG. 5, a difference between the pin connector 214 of the embodiment and the pin connector 114 is that: a plug section S2 of each connection pin 214$a$ is not parallel to a substrate 212$c$ of the light emitting diode element 212, and the plug section S2 is perpendicular to the substrate 212$c$ and is bended towards a back surface P2' of the substrate 212$c$.

Figure 6:
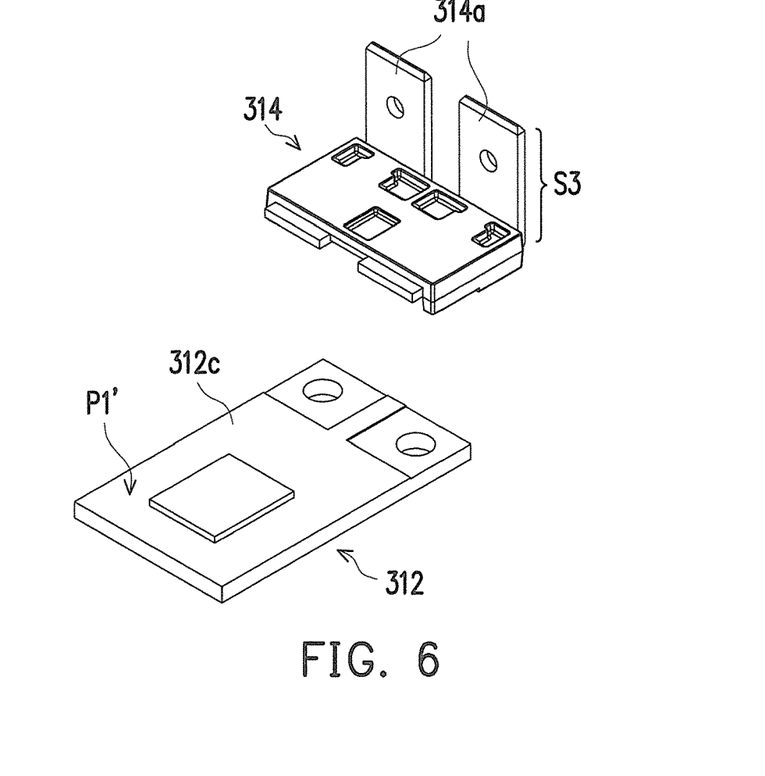
FIG. 6 is an exploded view of a light emitting diode element and a pin connector according to another embodiment of the invention.

Referring to FIG. 6, a difference between the pin connector 314 of the embodiment and the pin connector 114 is that: a plug section S3 of each connection pin 314$a$ is not parallel to a substrate 312$c$ of the light emitting diode element 312, and the plug section S3 is perpendicular to the substrate 312$c$ and is bended towards a light emitting surface P1' of the substrate 312$c$.

Figure 7:
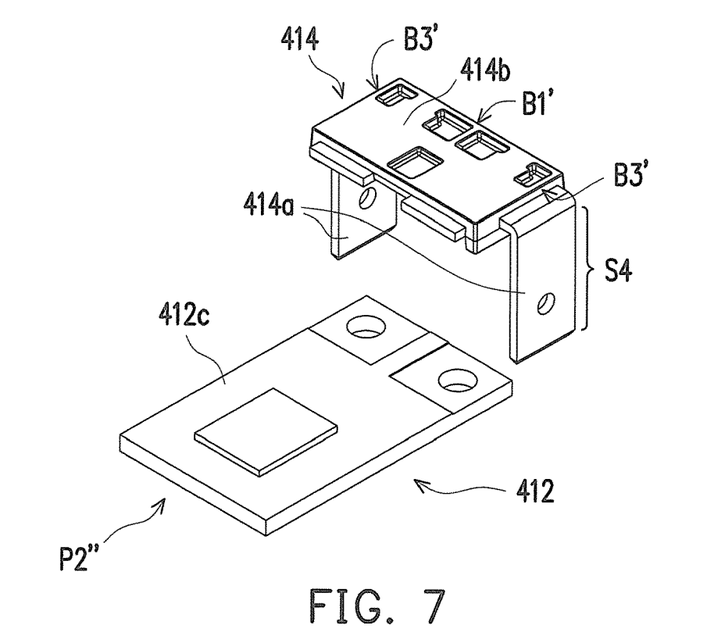
FIG. 7 is an exploded view of a light emitting diode element and a pin connector according to another embodiment of the invention.

Referring to FIG. 7, a difference between the pin connector 414 of the embodiment and the pin connector 114 is that: a plug section S4 of each connection pin 414$a$ does not extend out from a front end B1' of a base 414$b$ and is not parallel to a substrate 412$c$ of the light emitting diode element 412, and the plug sections S4 respectively extend out from two side ends B3' of the base 414$b$ and are perpendicular to the substrate 412$c$ and bended towards a back surface P2" of the substrate 412$c$.

Figure 8:
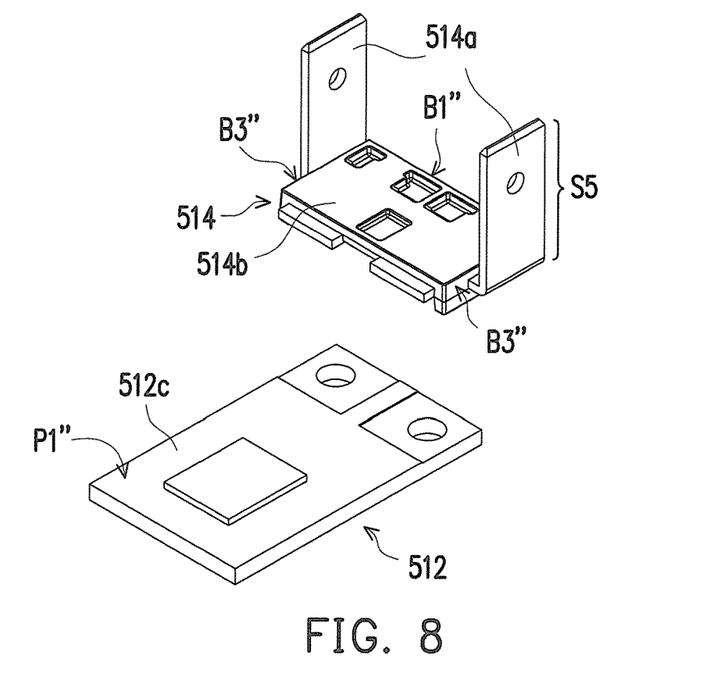
FIG. 8 is an exploded view of a light emitting diode element and a pin connector according to another embodiment of the invention.

Referring to FIG. 8, a difference between the pin connector 514 of the embodiment and the pin connector 114 is that: a plug section S5 of each connection pin 514$a$ does not extend out from a front end B1" of a base 514$b$ and is not parallel to a substrate 512$c$ of the light emitting diode element 512, and the plug sections S5 respectively extend out from two side ends B3" of the base 514$b$ and are perpendicular to the substrate 512$c$ and bended towards a light emitting surface P1" of the substrate 512$c$.

Figure 9:
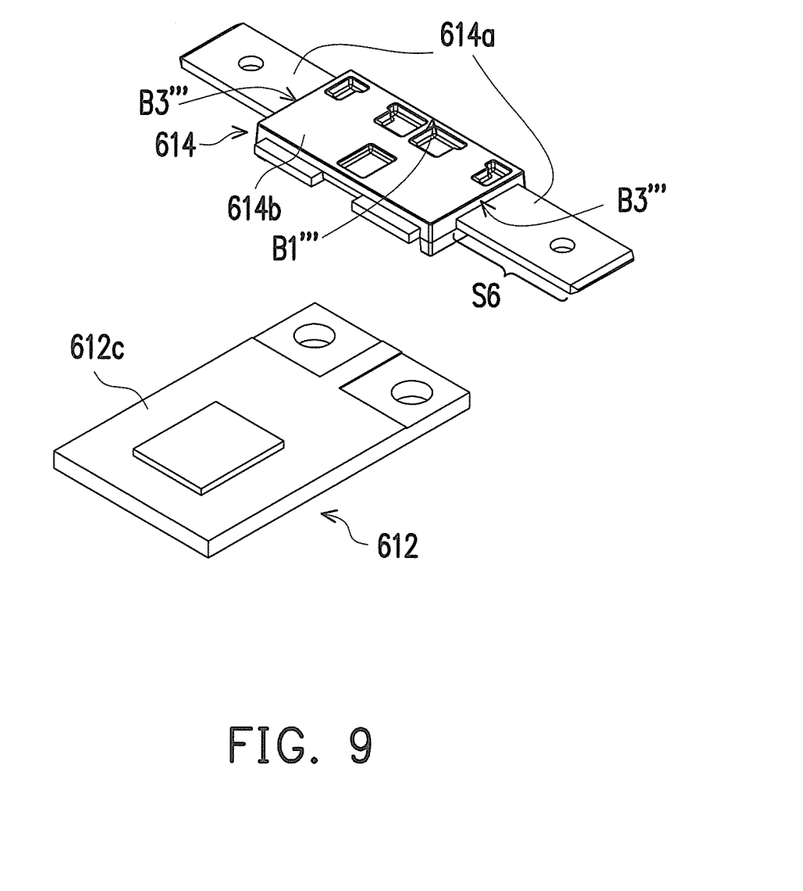
FIG. 9 is an exploded view of a light emitting diode element and a pin connector according to another embodiment of the invention.

Referring to FIG. 9, a difference between the pin connector 614 of the embodiment and the pin connector 114 is that: a plug section S6 of each connection pin 614$a$ does not extend out from a front end B1''' of a base 614$b$, and the plug sections S6 respectively extend out from two side ends B3''' of the base 614$b$ and are parallel to the substrate 612$c$ of the light emitting diode element 612.

In summary, the embodiments of the invention have at least one of the following effects. The light source module of the projector of the embodiment of the invention is connected to the power cords through the pin connector, such that a larger current may be supplied to the light emitting diode element through the wider connection pins of the pin connector, so as to improve the light emitting brightness of the light source module. Moreover, the pin connector and the joint of the power cord are connected through plugging, which is more simple compared to the welding or screw locking method of the conventional technique, such that the light source module may be easy in assembly and maintenance/repair, have high universality, and save a time of work. Moreover, the direction that the wire of the power cord extends out from the joint is perpendicular to the direction that the joint is plugged to the connection pin, so that the wire occupies less internal configuration space of the projector, and other components in the projector may have a more flexible arrangement, which avails reducing a whole thickness of the projector. Moreover, the connection pins of the pin connector may be designed to extend out from different parts of the base according to an actual requirement, and the plug sections of the connection pins are designed to be perpendicular or parallel to the substrate of the light emitting diode element, so as to further improve configuration flexibility of the other components in the projector.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising:
   a light emitting diode element, having a first electrode, a second electrode and a substrate, wherein the substrate has a top surface, and the top surface of the substrate is a light emitting surface;
   a pin connector, disposed on the light emitting diode element and having two connection pins, wherein each of the connection pins has a first connection end and a second connection end, and the two first connection ends are disposed on and contact to the first electrode and the second electrode respectively; and
   two power cords, respectively connected to the first electrode and the second electrode through the two connection pins, wherein each of the power cords comprises a joint and a wire connected to each other, each of the joints and the corresponding second connection end are mutually plugged along a first axial direction, each of the wires extends out from the corresponding joint along a second axial direction,
   wherein the first electrode has a first flat surface, the second electrode has a second flat surface, each of the first connection ends has a third flat surface, the top surface of the substrate is parallel with the first flat surface, the second flat surface and the third flat surfaces, the first flat surface partially overlaps and contacts one of the third flat surfaces, and the second flat surface partially overlaps and contacts the other one of the third flat surfaces, wherein the third flat surfaces partially overlap and contact the top surface of the substrate at the first flat surface of the first electrode and the second flat surface of the second electrode,
   wherein the pin connector has a base, the base is disposed on the substrate, and along a direction parallel to the second axial direction, a width of the substrate of the light emitting diode element is less than a width of the base of the pin connector.

2. The light source module as claimed in claim 1, wherein each of the joints comprises a first end portion, a second end portion, and a bending portion, the bending portion is connected between the first end portion and the second end portion, the first end portion and the corresponding connection pin are mutually plugged along the first axial direction, and each of the wires extends out from the corresponding second end portion along the second axial direction.

3. The light source module as claimed in claim 1, wherein a width of each of the connection pins is greater than or equal to 6 millimeters.

4. The light source module as claimed in claim 1, wherein the light emitting diode element is adapted to receive a current greater than or equal to 32 amperes through the pin connector.

5. The light source module as claimed in claim 1, wherein each of the connection pins has a plug section, and the plug section is parallel to the substrate and is plugged to the corresponding joint.

6. The light source module as claimed in claim 1, wherein each of the connection pins has a plug section, and each of the plug sections is perpendicular to the substrate and is plugged to the corresponding joint.

7. The light source module as claimed in claim 6, wherein the substrate further has a back surface opposite to the top surface being the light emitting surface, and each of the plug sections is bended towards the light emitting surface to be perpendicular to the substrate.

8. The light source module as claimed in claim 6, wherein the substrate further has a back surface opposite to the top surface being the light emitting surface, and each of the plug sections is bended towards the back surface to be perpendicular to the substrate.

9. The light source module as claimed in claim 1, wherein the light emitting diode element further comprises a light emitting unit, the light emitting unit is disposed on the substrate and the base has a front end and a back end, wherein the front end and the back end are opposite to each other, the back end faces the light emitting unit, and each of the connection pins extends out from the front end.

10. The light source module as claimed in claim 1, wherein the light emitting diode element further comprises a light emitting unit, the light emitting unit is disposed on the substrate, has a front end, a back end, and two side ends, wherein the front end and the back end are opposite to each other, the two side ends are opposite to each other and are connected between the front end and the back end, the back end faces the light emitting unit, and the two connection pins respectively extend out from the two side ends.

11. A projector, comprising:
    a light source module, comprising:
    a light emitting diode element, having a first electrode, a second electrode and a substrate, and adapted to provide an illumination beam, wherein the substrate has a top surface, and the top surface of the substrate is a light emitting surface;
    a pin connector, disposed on the light emitting diode element and having two connection pins, wherein each of the connection pins has a first connection end and a second connection end, and the two first connection ends are disposed on and contact to the first electrode and the second electrode respectively; and
    two power cords, respectively connected to the first electrode and the second electrode through the two connection pins, wherein each of the power cords comprises a joint and a wire connected to each other, each of the joints and the corresponding second connection end are mutually plugged along a first axial direction, each of the wires extends out from the corresponding joint along a second axial direction,
    wherein the first electrode has a first flat surface, the second electrode has a second flat surface, each of the first connection ends has a third flat surface, the top surface of the substrate is parallel with the first flat surface, the second flat surface and the third flat surfaces, the first flat surface partially overlaps and contacts one of the third flat surfaces, and the second flat surface partially overlaps and contacts the other one of the third flat surfaces, wherein the third flat surfaces partially overlap and contact the top surface of the substrate at the first flat surface of the first electrode and the second flat surface of the second electrode;
a light valve, adapted to convert the illumination beam into an image beam; and
a lens, adapted to project the image beam,
wherein the pin connector has a base, the base is disposed on the substrate, and along a direction parallel to the second axial direction, a width of the substrate of the light emitting diode element is less than a width of the base of the pin connector.

12. The projector as claimed in claim 11, wherein each of the joints comprises a first end portion, a second end portion, and a bending portion, the bending portion is connected between the first end portion and the second end portion, the first end portion and the corresponding connection pin are mutually plugged along the first axial direction, and each of the wires extends out from the corresponding second end portion along the second axial direction.

13. The projector as claimed in claim 11, wherein a width of each of the connection pins is greater than or equal to 6 millimeters.

14. The projector as claimed in claim 11, wherein the light emitting diode element is adapted to receive a current greater than or equal to 32 amperes through the pin connector.

15. The projector as claimed in claim 11, wherein each of the connection pins has a plug section, and the plug section is parallel to the substrate and is plugged to the corresponding joint.

16. The projector as claimed in claim 11, wherein each of the connection pins has a plug section, and each of the plug sections is perpendicular to the substrate and is plugged to the corresponding joint.

17. The projector as claimed in claim 16, wherein the substrate further has a back surface opposite to the top surface being the light emitting surface, and each of the plug sections is bended towards the light emitting surface to be perpendicular to the substrate.

18. The projector as claimed in claim 16, wherein the substrate further has a back surface opposite to the top surface being the light emitting surface, and each of the plug sections is bended towards the back surface to be perpendicular to the substrate.

19. The projector as claimed in claim 11, wherein the light emitting diode element further comprises a light emitting unit, the light emitting unit is disposed on the substrate, and the base has a front end and a back end, wherein the front end and the back end are opposite to each other, the back end faces the light emitting unit, and each of the connection pins extends out from the front end.

20. The projector as claimed in claim 11, wherein the light emitting diode element further comprises a light emitting unit, the light emitting unit is disposed on the substrate, and the base has a front end, a back end, and two side ends, wherein the front end and the back end are opposite to each other, the two side ends are opposite to each other and are connected between the front end and the back end, the back end faces the light emitting unit, and the two connection pins respectively extend out from the two side ends.

* * * * *